(12) United States Patent
Jeng

(10) Patent No.: US 11,287,327 B2
(45) Date of Patent: Mar. 29, 2022

(54) CABLE TEMPERATURE SENSING DEVICE

(71) Applicant: Chung Yuan Christian University, Taoyuan (TW)

(72) Inventor: Syang-Ywan Jeng, Taipei (TW)

(73) Assignee: CHUNG-YUAN CHRISTIAN UNIVERSITY, Taoyuan (TW)

(*) Notice: Subject to any disclaimer, the term of this patent is extended or adjusted under 35 U.S.C. 154(b) by 356 days.

(21) Appl. No.: 16/413,764

(22) Filed: May 16, 2019

(65) Prior Publication Data
US 2020/0309605 A1    Oct. 1, 2020

(30) Foreign Application Priority Data

Mar. 29, 2019  (TW) .................................. 108111253

(51) Int. Cl.
*G01K 1/024* (2021.01)
*G01K 1/02* (2021.01)
*G01K 11/32* (2021.01)
*G01K 11/324* (2021.01)

(52) U.S. Cl.
CPC ............. *G01K 1/024* (2013.01); *G01K 1/026* (2013.01); *G01K 11/32* (2013.01); *G01K 11/324* (2021.01)

(58) Field of Classification Search
CPC ........ G01K 1/024; G01K 1/026; G01K 11/32; G01K 11/324
See application file for complete search history.

(56) References Cited

U.S. PATENT DOCUMENTS

| | | | | |
|---|---|---|---|---|
| 4,878,226 A | * | 10/1989 | McQuoid | G01K 1/026 374/166 |
| 7,343,261 B1 | * | 3/2008 | Kell | G01K 3/00 324/160 |
| 2004/0101024 A1 | * | 5/2004 | Kawai | G01K 1/024 374/141 |
| 2004/0178925 A1 | * | 9/2004 | Kawai | G01K 1/02 340/870.17 |
| 2009/0262781 A1 | * | 10/2009 | Shumaker | G01K 1/08 374/141 |
| 2011/0280281 A1 | * | 11/2011 | Kennedy | G01K 3/14 374/185 |
| 2012/0268290 A1 | * | 10/2012 | Huang | G01K 1/024 340/870.02 |
| 2013/0191066 A1 | * | 7/2013 | Spillane | H02G 7/00 702/135 |
| 2015/0139272 A1 | * | 5/2015 | Hanking | G01J 5/0096 374/121 |
| 2019/0295797 A1 | * | 9/2019 | Ran | H01H 11/0062 |

* cited by examiner

*Primary Examiner* — Nathaniel T Woodward
*Assistant Examiner* — Philip L Cotey

(57) ABSTRACT

The present invention discloses a cable temperature sensing device, which consists of a plurality of temperature sensing modules disposed on an identical cable. By such arrangement, the temperature sensing modules are configured to measure a plurality of temperature values from different positions on the cable, and then convert the plurality of temperature values to a cable temperature data through a temperature reading module.

3 Claims, 4 Drawing Sheets

CABLE TEMPERATURE SENSING DEVICE

BACKGROUND OF THE INVENTION

1. Field of the Invention

The present invention relates to the technology field of sensing devices, and more particularly to a cable temperature sensing device.

2. Description of the Prior Art

With the development of science and technology, electric power has become an indispensable important energy source. It is especially important for the technology industry. Once a power supply system is abnormal, the technology industry is bound to suffer from significant losses.

The cable is a main bridge for the power supply system, and is configured to be used as a transmission medium for industrial electricity or people's livelihood. However, if the cable is overloaded for a long period of time, the cable will be heated. The long-term high temperature of the cable would cause the insulation capability of the cable be decreased, and accelerate the cracking of the insulation layer. Moreover, the high temperature would also cause the resistance of the cable to increase, so as to aggravate the heat increase and power loss. Therefore, it needs to frequently measure the temperature of the cable in order to avoid the cable from failure due to get excessive temperature.

There are several commonly-used cable temperature monitoring methods proposed, including a temperature sensing cable temperature measurement, an infrared sensing temperature measurement, and a distributed optical fiber temperature measurement. When the temperature sensing cable temperature measurement is implemented, a cable set is constituted an electrical cable and a temperature sensing cable parallel and adjacent to the electrical cable. By such arrangement, when the cable temperature of the electrical cable exceeds a threshold temperature, the temperature sensing cable would be electrically shorted, such that a back-end control system subsequently receive a warning signal. However, the temperature sensing cable temperature measurement commonly exhibits shortcomings due to the fact that the temperature sensing cable is unable to be the installed and maintained easily as well as the temperature sensing cable may be damaged easily.

The infrared sensing temperature measurement is one kind of noncontact measurement, and has good safety. However, the infrared sensing temperature measurement is easily influenced by radiative emissivity of adjacent objects and aerial fog due to its poor anti-interference ability.

The distributed optical fiber temperature measurement achieves the temperature detection by using Raman scattering temperature effect. Although the distributed optical fiber temperature measurement has the principal advantage of high precision, the manufacturing cost and the maintenance cost of the distributed optical fiber temperature measurement are both high, such that the distributed optical fiber temperature measurement is not suitable for being applied to carry out the temperature detection of a wide range of electrical cables.

From above descriptions, it is understood that how to design a cable temperature sensing device including the main advantage of detecting the cable temperature immediately, efficiently and accurately has become the primary issue of cable suppliers. In view of that, the inventor of the present application has made great efforts to make inventive research thereon and eventually provided a cable temperature sensing device.

SUMMARY OF THE INVENTION

The primary objective of the present invention is to provide a cable temperature sensing device, which consists of a plurality of temperature sensing modules disposed on an identical cable. By such arrangement, the temperature sensing modules are configured to measure a plurality of temperature values from different positions on the cable, and then convert the plurality of temperature values to a cable temperature data through a temperature reading module.

In order to achieve the primary objective of the present invention, the inventor of the present invention provides an embodiment for a cable temperature sensing device, comprising:

a temperature reading module; and a plurality of temperature sensing modules, being disposed in a cable and coupled to the temperature reading module;

wherein each temperature sensing module having memory for storing individual identification number is driven to measure at least one node temperature of the cable according to the temperature reading modules signal, and subsequently combining the measured temperature with corresponding identification number and transmitting the corresponding module identification numbers with the measured temperature information to the temperature reading module.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a cable temperature sensing device disclosed by the present invention, embodiments of the present invention will be described in detail with reference to the attached drawings hereinafter.

Figure 1:
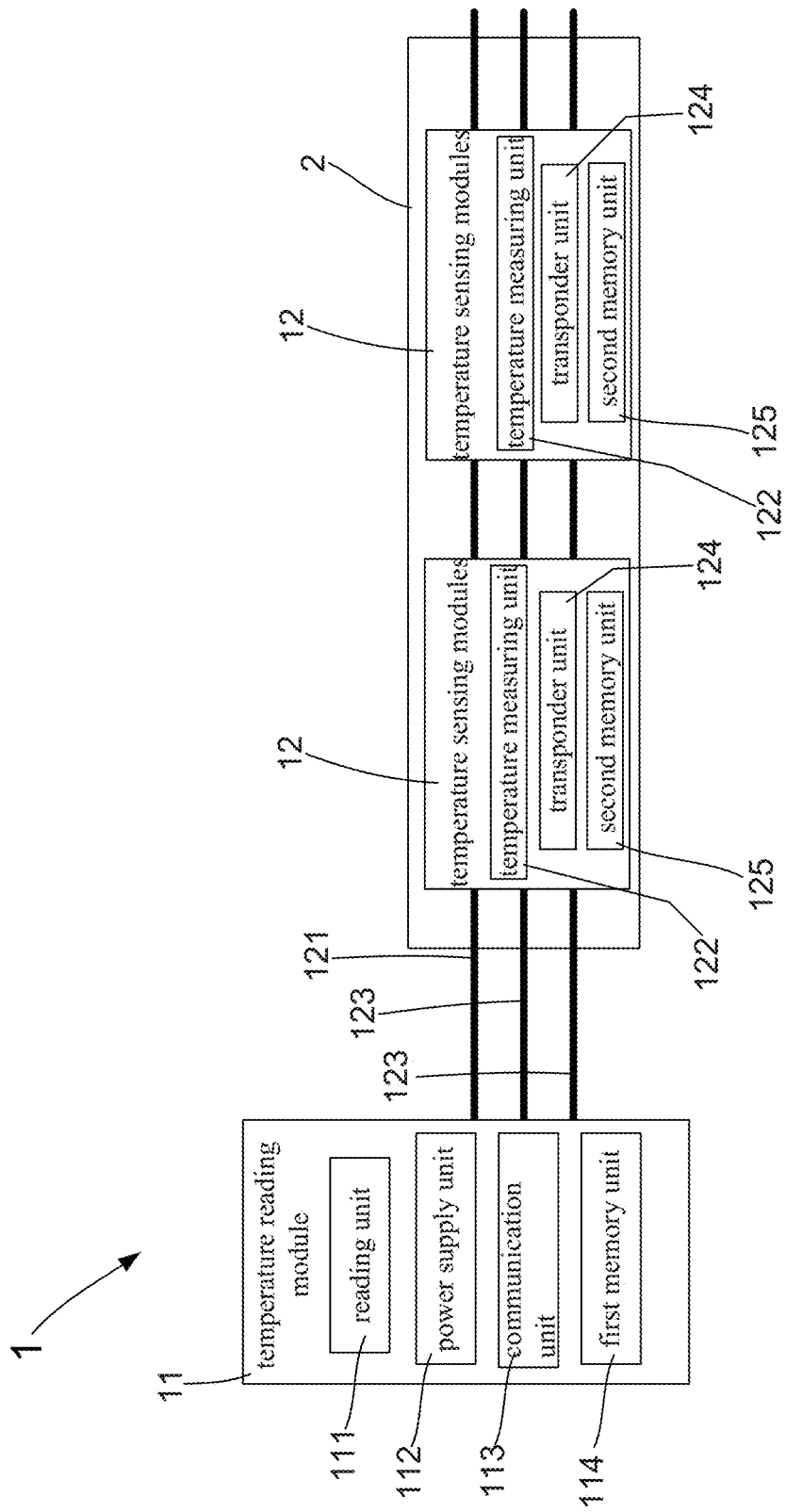
FIG. 1 shows a circuit block diagram of a cable temperature sensing device according to the present invention.
Figure 2:
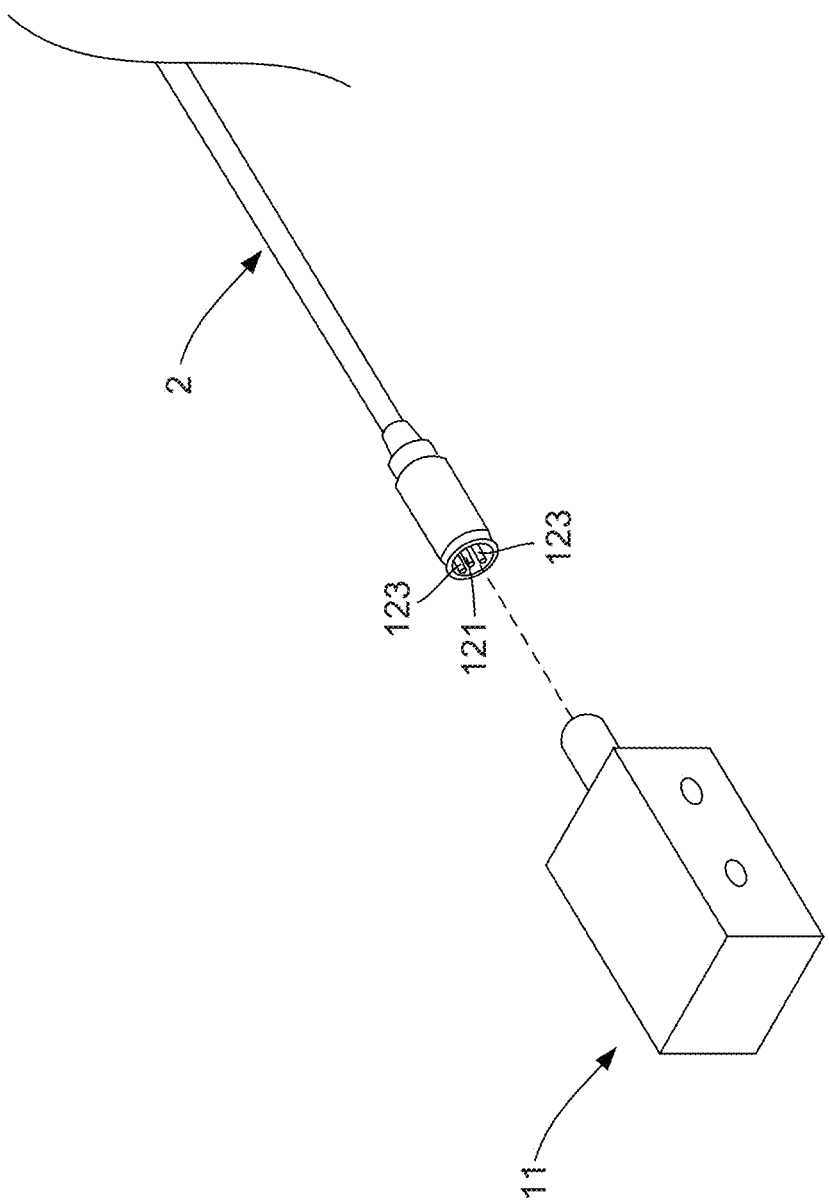
FIG. 2 shows a schematic stereo diagram of the cable temperature sensing device according to the present invention.

Please refer to FIG. 1 and FIG. 2, wherein FIG. 1 shows a circuit block diagram of a cable temperature sensing device according to the present invention, and FIG. 2 shows a schematic stereo diagram of the cable temperature sensing device according to the present invention. The cable temperature sensing device of the present invention comprises: a temperature reading module 11 and a plurality of temperature sensing modules 12, wherein the temperature reading module 11 has a reading unit 111, a power supply unit 112, a communication unit 113, and a first memory unit 114.

Moreover, the reading unit 111 is electrically connected to the power supply unit 112, and the power supply unit 112 is electrically connected to the temperature sensing modules 12. In the present invention, the communication unit 113 is coupled to the reading unit 111, such that the reading unit 111 transmits the cable temperature data to an electronic device through the communication unit 113. On the other hand, the first memory unit 114 is coupled to the reading unit 111 for storing the cable temperature data. Herein, it needs further explain that, the present invention does not particularly limit the type of the communication unit 113, and which can be a Wi-Fi communication unit, a RFID communication unit, a Bluetooth communication unit, an infrared communication unit, a Zigbee communication unit, a 4G communication unit, or a 5G communication unit. Furthermore, the reading unit 111 is selected from the group consisting of central processing unit, microcontroller unit and field programmable gate array.

In the present invention, the temperature sensing modules 12 are disposed in a cable 2 and coupled to the temperature reading module 11. FIG. 1 depicts that the temperature sensing modules 12 comprises: a signal terminal 121, a temperature measuring unit 122, two power terminals 123, a transponder unit 124 and a second memory unit 125, wherein the signal terminal 121 is electrically connected to the reading unit 111, and the temperature measuring unit 122 is electrically connected to the cable 2 for measuring the at least one node temperature of the cable. The transponder unit 124 is electrically connected to the signal terminal 121 for receiving, processing and transmitting signals between the temperature reading module 11 and the temperature sensing module 12. The second memory unit 125 is electrically connected to the transponder unit 124 for storing the individual identification number. Moreover, the two power terminals 123 are coupled to the temperature measuring unit 122, and electrically connected to the power supply unit 112. Herein, it needs further explain that, the present invention does not particularly limit the type of the temperature measuring unit 122, and which can be a thermistor sensor, a transistor temperature sensor or a thermocouple sensor.

Particularly, the temperature sensing modules 12 are driven to measure at least one node temperature data of the cable 2 according to an external circuit signal, and subsequently convert the node temperature data to a node temperature information so as to next transmit the node temperature information to the temperature reading module 11. Therefore, the reading unit 111 converts the node temperature information into a cable temperature data. Moreover, after the temperature measuring unit 122 measures the at least one node temperature data of the cable 2, the temperature reading module 11 transmits the external circuit signal to the temperature measuring unit 122 by the signal transmission terminal 121 thereof, so as to make the temperature measuring unit 122 measure the at least one node temperature of the cable 2 according to the external circuit signal. Consequently, the node temperature information is generated by the temperature measuring unit 122 based on the at least one node temperature, such that the node temperature information is transmitted from the temperature measuring unit 122 to the reading unit 111 via the signal terminal 121.

Figure 3:
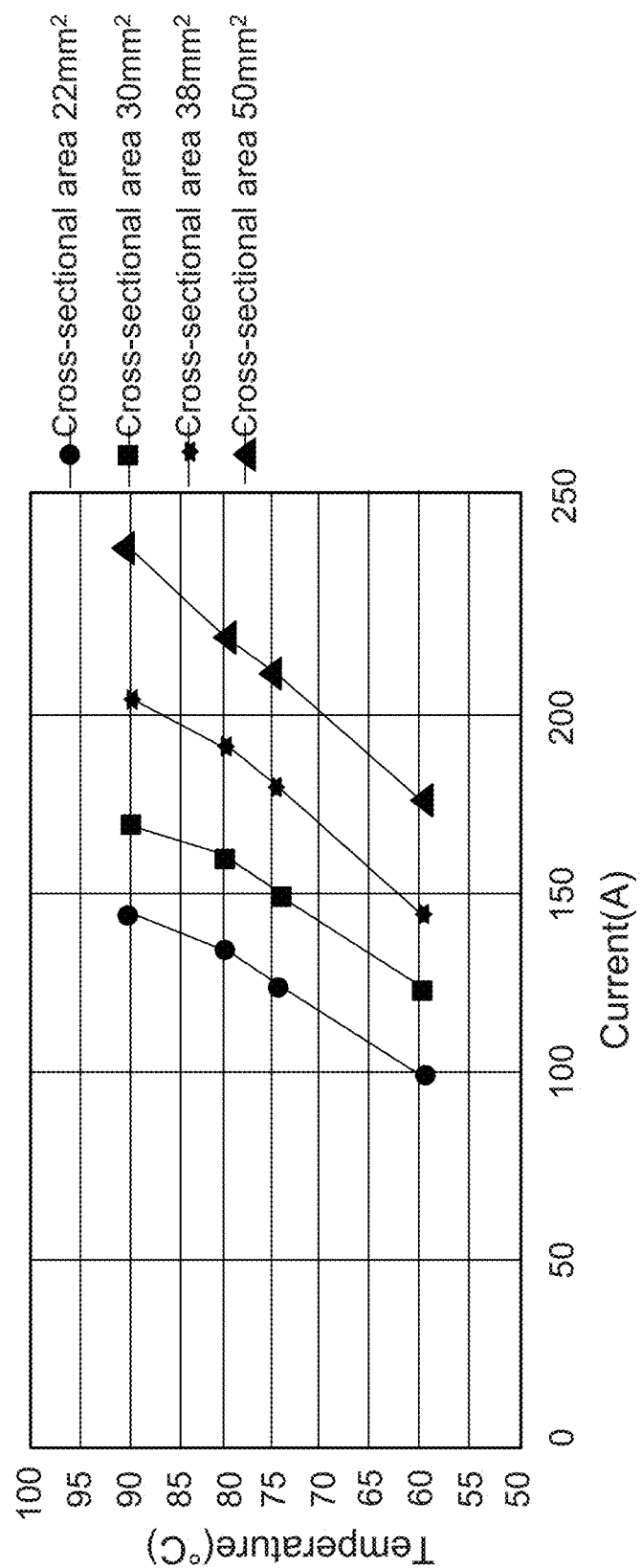
FIG. 3 shows a data graph of current versus temperature.

For proving the practicability of the cable temperature sensing device, inventors of the present invention have completed some experiments and then obtain a variety of experimental data. Please refer to FIG. 3, which shows a data graph of current versus temperature. Herein, it is worth explaining that, the three data plotted curves shown in FIG. 3 are obtained by applying a cable temperature measurement to three cables with their specific area of section different from each other. From the data of FIG. 3, it is easy to find that, the cable having the area of section larger than that of others cable contains higher cable temperature. Therefore, experimental data imply that a specific cable having a large area of section is able to transmit a high-density current, and the high-density current cause the specific cable have a high cable temperature.

Figure 4:
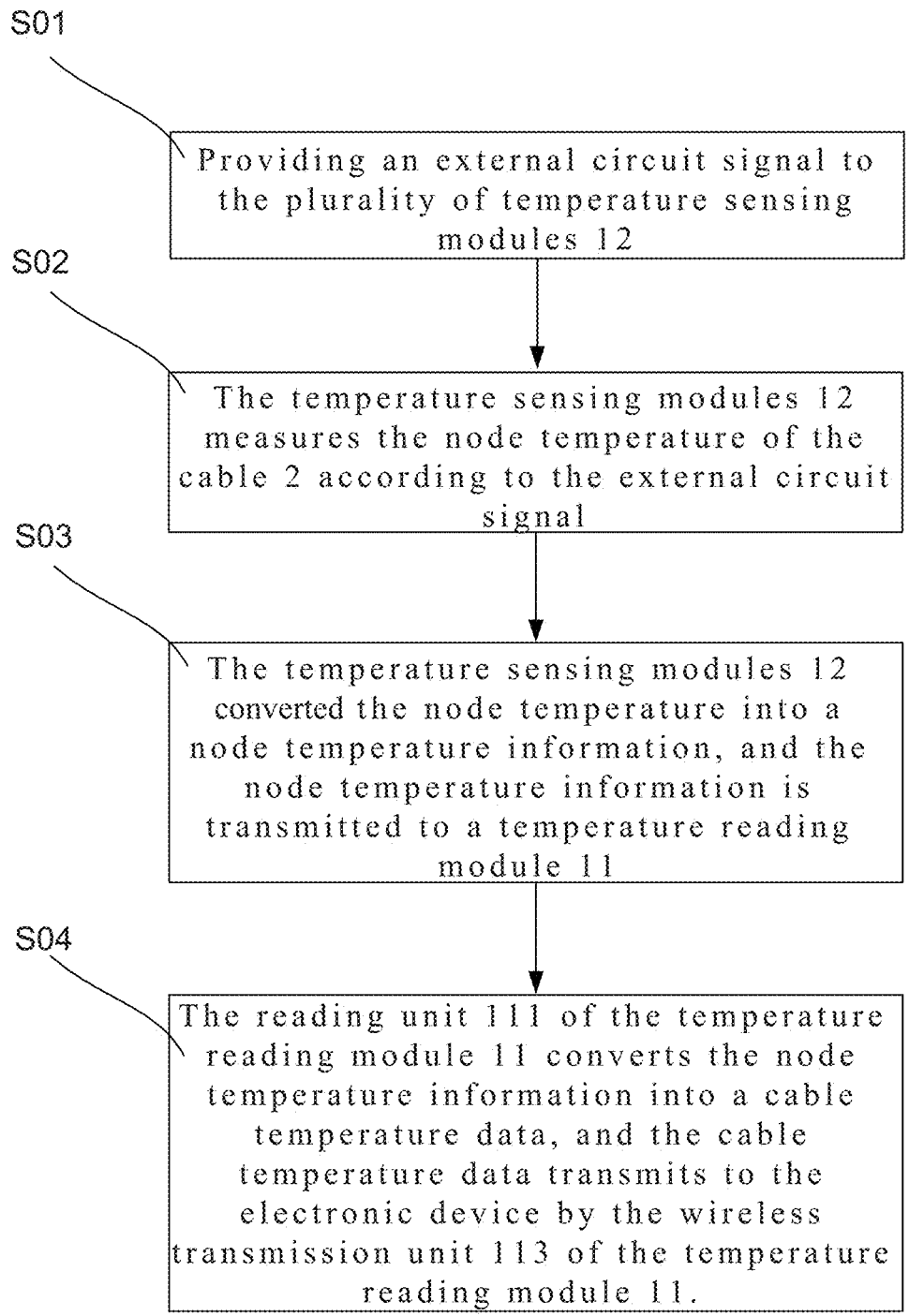
FIG. 4 shows a flowchart diagram of a method for controlling the cable temperature sensing device according to the invention.

Continuously referring to FIG. 4, which shows a flowchart diagram of a method for controlling the cable temperature sensing device according to the invention. According to the flowchart diagram of FIG. 4, the method firstly proceeds to step S01 for providing an external circuit signal to a plurality of temperature sensing modules 12 disposed in a cable 2. Next, the method is proceeded to step S01, such that the temperature sensing modules 12 are controlled to measure at least one node temperature of the cable 2 according to the external circuit signal. Subsequently, in step S03, the temperature sensing modules 12 convert the at least one node temperature to a node temperature information, and the node temperature information is subsequently transmitted from the temperature sensing modules 12 to a temperature reading module 11. Eventually, in step S04, the reading unit 111 of the temperature reading module 11 converts the node temperature information into a temperature data, and then the temperature reading module 11 transmits the temperature data to an electronic device through a communication unit 113 thereof.

Through above descriptions, all constituting elements of the cable temperature sensing device proposed by the present invention have been introduced completely and clearly; in summary, the present invention includes the advantages of:

The present invention discloses a cable temperature sensing device 1, which consists of a plurality of temperature sensing modules 12 disposed on an identical cable. By such arrangement, the temperature sensing modules 12 are configured to measure a plurality of temperature values from different positions on the cable, and then convert the plurality of temperature values to a cable temperature data through a temperature reading module 11.

The above description is made on embodiments of the present invention. However, the embodiments are not intended to limit scope of the present invention, and all equivalent implementations or alterations within the spirit of the present invention still fall within the scope of the present invention.

What is claimed is:
1. A cable temperature sensing device, comprising:
 a plurality of printed substrate boards, being disposed and distributed in an electrical cable;
 a plurality of temperature sensors, being disposed on the printed substrate boards, respectively; and
 an electronic device, being coupled to the plurality of printed substrate boards through a signal transmission wire, a first power wire and a second power wire, and comprising: an input output (I/O) interface coupled to the signal transmission wire, a microprocessor coupled to the I/O interface, a power management chip coupled to the microprocessor, the first power wire and the second power wire, a wireless transmission interface coupled to the microprocessor, and a memory coupled to the microprocessor;
 wherein the microprocessor comprises at least one embedded programs including instructions for:
 controlling the power management chip to supply an electrical power to the plurality of printed substrate boards via the first power wire and the second power wire, so as to enable the plurality of temperature sensors distributed in the electrical cable to detect a plurality of cable temperatures;

receiving the plurality of cable temperatures through the signal transmission wire and the I/O interface;

converting the plurality of cable temperatures to a temperature data for respectively describing a plurality of node temperatures of the electrical cable; and storing the temperature data in the memory, and/or transmitting the temperature data to an external electronic device through the wireless transmission interface.

2. The cable temperature sensing device of claim 1, wherein the temperature sensor is selected from a group consisting of thermistor sensor, bipolar junction transistor (BJT) temperature sensor and thermocouple sensor.

3. The cable temperature sensing device of claim 1, wherein the wireless transmission interface is selected from a group consisting of RFID interface, Wi-Fi interface, Zigbee interface, 4G mobile communication interface, and 5G mobile communication interface.

\* \* \* \* \*